(12) United States Patent
Fries et al.

(10) Patent No.: US 10,067,486 B2
(45) Date of Patent: Sep. 4, 2018

(54) SYSTEM AND METHOD FOR PROVIDING A CONTROL PROGRAM CODE (75) Inventors: Steffen Fries, Baldham (DE); Jürgen Gessner, Forstinning (DE); Hans-Joachim Hof, Ingolstadt (DE); Angela Schattleitner, Tuntenhausen (DE)

(73) Assignee: Siemens Aktiengesellschaft, Munich (DE)

( * ) Notice: Subject to any disclaimer, the term of this patent is extended or adjusted under 35 U.S.C. 154(b) by 440 days.

(21) Appl. No.: 14/345,574

(22) PCT Filed: Sep. 3, 2012

(86) PCT No.: PCT/EP2012/067133
§ 371 (c)(1),
(2), (4) Date: Jun. 16, 2014

(87) PCT Pub. No.: WO2013/041360
PCT Pub. Date: Mar. 28, 2013

(65) Prior Publication Data
US 2014/0358257 A1 Dec. 4, 2014

(30) Foreign Application Priority Data

Sep. 19, 2011 (DE) .................. 10 2011 082 962

(51) Int. Cl.
H04L 29/08 (2006.01)
G05B 15/02 (2006.01)
(Continued)

(52) U.S. Cl.
CPC ......... G05B 15/02 (2013.01); G05B 19/0426 (2013.01); G06F 21/33 (2013.01);
(Continued)

(58) Field of Classification Search
CPC ..... G05B 15/02; G05B 19/0426; G06F 21/44; G06F 8/61; G06F 21/33; H04L 67/12;
(Continued)

(56) References Cited

U.S. PATENT DOCUMENTS 6,823,454 B1 * 11/2004 Hind ................. H04L 29/12066
713/168
7,330,768 B2 2/2008 Scott et al.
(Continued)

FOREIGN PATENT DOCUMENTS

CN 1525271 9/2004
DE 102007046079 A1 4/2009
(Continued)

Primary Examiner — Meng Li
(74) Attorney, Agent, or Firm — Cozen O'Connor (57) ABSTRACT A system for providing a control program code (SPC) for controlling a device connected to a control device has: an authentication service which, after successful authentication of the device with respect to the authentication service, transmits a device ID (FG-ID) of the authenticated device to a commissioning service which, on the basis of the device ID (FG-ID) of the authenticated device, transmits a control program code (SPC) to a control device which controls the authenticated device using the control program code (SPC).

12 Claims, 4 Drawing Sheets (51) Int. Cl.
  *G06F 21/33* (2013.01)
  *H04L 29/06* (2006.01)
  *G05B 19/042* (2006.01)
  *G06F 21/44* (2013.01)
  *G06F 8/61* (2018.01)
(52) U.S. Cl.
  CPC .......... *G06F 21/44* (2013.01); *H04L 63/0823* (2013.01); *H04L 63/0876* (2013.01); *H04L 67/12* (2013.01); *H04L 67/28* (2013.01); *G06F 8/61* (2013.01)
(58) Field of Classification Search
  CPC .. H04L 67/28; H04L 63/0876; H04L 63/0823
  See application file for complete search history.

(56) References Cited

U.S. PATENT DOCUMENTS

| | | | |
|---|---|---|---|
| 7,904,608 B2 | 3/2011 | Price | |
| 8,644,188 B1* | 2/2014 | Brandwine | H04L 12/4666 370/254 |
| 2004/0107024 A1* | 6/2004 | Yoon | F24F 11/006 700/276 |
| 2004/0260408 A1 | 12/2004 | Scott et al. | |
| 2005/0021705 A1* | 1/2005 | Jurisch | G05B 19/042 709/223 |
| 2005/0033994 A1* | 2/2005 | Suzuki | H04L 63/083 726/19 |
| 2006/0026304 A1 | 2/2006 | Price | |
| 2007/0234432 A1* | 10/2007 | Korkishko | H04L 63/0492 726/27 |
| 2009/0204815 A1* | 8/2009 | Dennis | H04L 63/1416 713/168 |
| 2010/0322393 A1* | 12/2010 | Jin | H04M 3/537 379/88.12 |
| 2010/0325719 A1* | 12/2010 | Etchegoyen | H04L 63/0272 726/15 |

FOREIGN PATENT DOCUMENTS

| | | |
|---|---|---|
| EP | 1688840 A2 | 8/2006 |
| WO | WO 2007075097 A1 | 7/2007 |

* cited by examiner

SYSTEM AND METHOD FOR PROVIDING A CONTROL PROGRAM CODE

CROSS-REFERENCE TO RELATED APPLICATIONS

This is a U.S. national stage of application No. PCT/EP2012/067133, filed on 3 Sep. 2012, which claims priority to the German Application No. 10 2011 082 962.8, filed 19 Sep. 2011, the content of both incorporated herein by reference.

BACKGROUND OF THE INVENTION

1. Field of the Invention

The invention relates to a method and a system for providing a control program code for controlling a device, in particular a field device, which is connected to a control device and is controlled by the control program code.

2. Related Art

Conventional control devices, for example PLC control devices of an automation installation, are not designed to drive newly added field devices or exchange devices that differ from the previously-driven field, since a change in the programming or of the control program code SPC is necessary for the new devices. The functional code change in the control program code SPC necessary here goes beyond a mere change in configuration. For this reason, an extension with an additional field device or the exchange of a field device at conventional automation installations in an industrial environment represents a considerable outlay, since it entails a functional code change to the control program code SPC for driving the field device that is to be added or exchanged. In conventional installations, the control program code for driving a field device that has been added or exchanged is usually reprogrammed manually. Conventional automation installations are therefore extremely inflexible with regard to extensions or to an exchange of existing field devices.

SUMMARY OF THE INVENTION

It is therefore an object of the present invention to establish a method and a system for providing a control program code for controlling a device that is added to an existing automation installation, or that replaces an existing device of an automation installation.

This object is fulfilled according to the invention by a system for providing a control program code for controlling a device which is connected to a control device, with an authentication service which, after successful authentication of the device with respect to the authentication service, transmits a device ID of the authenticated device to a commissioning service which, depending on the device ID of the authenticated device, transmits a control program code to a control device which controls the authenticated device by the control program code.

The system according to this aspect of the invention offers the advantage that installation and exchange of the device, as well as programming of the control program code for this device, is markedly simplified and accelerated, without the need for manual intervention on the part of service personnel. The system according to the aspect of the invention thus permits "plug and work" to a newly installed or exchanged device that is controlled by a control device by the control program code.

In one aspect of the invention, a commissioning service generates the control program code depending on the device ID of the authenticated device.

In a further aspect of the invention, the commissioning service changes an existing control program code for the authenticated device depending on the device ID of the authenticated device.

According to another aspect of the invention, the device is a field device that is connected via a network access switch.

In another aspect, in the system according to the invention, not only the device but also the control device for driving the device and a proxy server are connected to the network access switch.

In another aspect, in the system according to the invention, the network access switch connects the device to the proxy server in a VLAN connection.

In another aspect, in the system according to the invention, the network access switch connects the device to the control device in a second VLAN connection.

In another aspect, in the system according to the invention, the proxy server is connected to the authentication service.

In another aspect, in the system according to the invention, the device authenticates itself with respect to the authentication service by at least one authentication credential.

In this case the device is preferably connected to the authentication service during the authentication process via the first VLAN connection and the proxy server.

In another aspect, in the system according to the invention, after transmission of the control program code to the control device, the control device is connected via the second VLAN connection to the authenticated device for its control by the control program code.

In another aspect, in the system according to the invention, the authentication credential of the device is made available by an external device which is connected temporarily to the device via a local, wireless or wired interface.

In another aspect, in the system according to the invention, the commissioning service generates the control program code depending on the device ID of the authenticated device, or changes a control program code that already exists for the authenticated device, if an examination of the device ID with reference to a specified examination rule indicates the necessity for generating or for extending the control program code.

In another aspect, in the system according to the invention, the commissioning service generates or changes the control program code of the authenticated device depending on the device ID of the authenticated device and also depending on device property data of the authenticated device.

According to yet another aspect of the invention, a method provides a control program code for controlling a device which is connected to a control device, wherein, after successful authentication of the device with respect to an authentication service, a device ID of the authenticated device is transmitted by the authentication service to a commissioning service which, depending on the device ID of the authenticated device, transmits a control program code to a control device that controls the authenticated device by the control program code.

In another aspect, in the method according to the invention, the commissioning service generates the control program code depending on the device ID of the authenticated device.

In another aspect, in the method according to the invention, the commissioning service changes a control program code that already exists for the authenticated device depending on the device ID of the authenticated device.

In another aspect, in the method according to the invention, the commissioning service generates or changes the control program code additionally depending on device property data of the authenticated device.

BRIEF DESCRIPTION OF THE DRAWINGS

Possible exemplary embodiments of the system according to the invention and of the method according to the invention for the provision of a control program code for controlling a device are described in more detail below with reference to the enclosed figures, in which.

DETAILED DESCRIPTION OF THE PRESENTLY PREFERRED EMBODIMENTS

Figure 1:
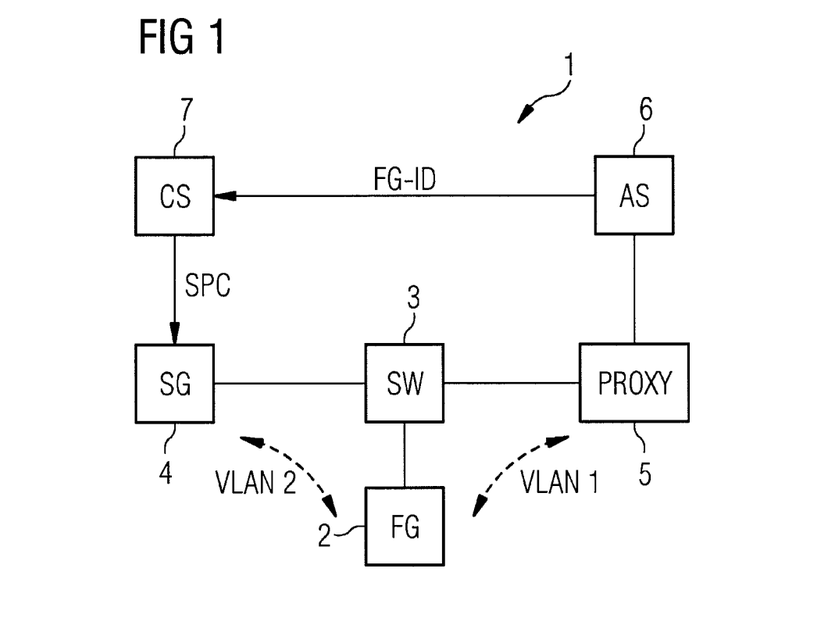
FIG. 1 illustrates an exemplary embodiment of a system according to the invention for providing a control program code for controlling a device.

As can be seen in FIG. 1, a system 1 for providing a control program code SPC has at least one device 2, which can, for example, be a field device 2 (FG) of an automation installation. This field device is connected, in the exemplary embodiment illustrated in FIG. 1, via a network access switch 3. This network access switch 3 can connect the field device 2 on one side to a control device 4 (SG) and on the other side to a proxy server 5. As is illustrated in FIG. 1, the proxy server 5 is connected, directly or via a network, to an authentication service 6. The authentication service 6 is, for its part, connected directly or via a network to a commissioning service 7. The commissioning service 7 is, for its part, connected directly or via a network to the control device 4. In the case of successful authentication of the device 2 with respect to the authentication service 6, by an authentication credential of the device 2, the authentication service 6 transmits a device ID, for example a field device ID, of the field device 2 illustrated in FIG. 1, to the commissioning service 7, which, depending on the device ID of the authenticated device 2, transmits a control program code SPC to the control device 4, and then controls the authenticated device 2 by the control program code SPC. The field device 2 is here preferably connected during the authentication process via a first VLAN connection VLAN 1 and the network access switch 3 to the proxy server 5 which is connected to the authentication service 6. After the control program code SPC has been transmitted to the control device 4, the control device 4 is connected via a second VLAN connection VLAN 2 and the network access switch 3 to the field device 2, and can drive the field device 2 with the help of the control program code SPC. The authentication credentials used can be a certificate or a pair of cryptographic keys whose private or secret key is stored under access protection on the field device 2, or may be some other authentication credential.

In one exemplary embodiment, the commissioning service 7 generates the control program code SPC depending on the device ID of the authenticated device 2, and transmits the control program code SPC that has been generated to the control device 4, which then drives the authenticated device 2 by the control program code SPC, for example via a fieldbus. In a further possible embodiment, the commissioning service 7 extends or modifies a control program code SPC that already exists for the field device 2, depending on the transmitted device ID of the authenticated device 2. In one possible embodiment, the commissioning service 7 changes the control program code SPC depending on the device ID of the authenticated device 2, or generates a control program code SPC depending on the device ID of the authenticated device 2, only in the event that an examination of the device ID of the authenticated device 2 with reference to a specified examination rule indicates the necessity for generating or for extending the control program code SPC. In one possible embodiment, the commissioning service 7 can store in advance what are known as engineering images, which are intended for the control device 4 for driving the device 2. Engineering images can, for example, take various possible applications of the connected field device 2 into account, and provide different functionalities, depending on the connected field device. An extension of the functions of the control program code SPC can here comprise different items, for example a change in the number of possible devices 2 that can be connected with reference to the processing of the supplied data, a change to a communication behavior depending on the devices 2 that are connected, as well as the insertion of preliminary processing steps depending on the connected devices 2.

On the basis of the identity determined or of the device ID of the authenticated device 2, the commissioning service 7 can check whether a control program code SPC needs to have a new code, i.e. a functional code extension, added. This examination can contain various simple or complex rules. For example, a functional code extension of the control program code is performed as soon as a single device, in particular a field device, has been added.

Alternatively, a functional code extension of the control program code SPC can be made as soon as a specified number of particular devices 2 is added.

Furthermore, a functional code extension to the control program code SPC can alternatively also be made as soon as at least a specified number of devices, in particular field devices, has been added.

Furthermore, a functional code extension to the control program code SPC can alternatively be made as soon as one device 2, in particular a field device, out of a number of specified devices, is added.

Corresponding rules for a code extension to the control program code, or a change to the control program code, can also be specified for the removal of devices 2.

If, after fulfilling the specified rules, it is necessary for the commissioning service 7 to perform a functional code extension or code change to the control program code for one or for a plurality of control program codes SPC, the image stored for this functional code extension can, in one possible embodiment, be searched for or selected on the basis of the above-mentioned rules, and transmitted with an existing commissioning mechanism to the control device 4. System 1 illustrated in FIG. 1 shows an automated functional code extension or code adaptation of a control program code SPC for an authenticated device 2, for example after the addition or removal of a field device 2.

Figure 2:
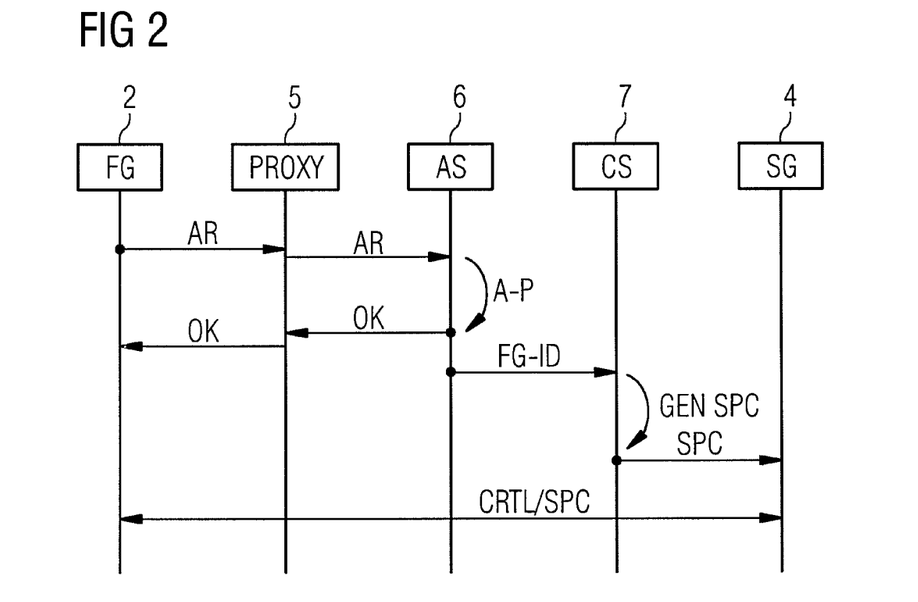
FIG. 2 is a signal diagram to explain the method of operation of a system according to the invention and of a method according to the invention for providing a control program code for controlling a device.

FIG. 2 shows a signal diagram to explain the mode of operation of system 1 according to the invention and of the method according to the invention for providing a control program code SPC for controlling a device 2, in particular a field device.

As illustrated in FIG. 2, a newly added or exchanged field device or device 2 transmits an authentication request AR, for example via the proxy server 5 illustrated in FIG. 1, to an authentication service 6. In one possible embodiment, the authentication request AR is transmitted via a first VLAN connection VLAN 1 by means of the network access switch 3 illustrated in FIG. 1 to the proxy server 5, and from there to the authentication service 6. The authentication request AR contains a device ID and/or an authentication credential of the device 2. In one possible variant, the authentication request AR can additionally contain device-specific property data of the device 2. The authentication credential can involve any arbitrary authentication credential, for example a cryptographic key or a certificate of the device 2.

With the aid of the authentication credential, the device 2 authenticates itself with respect to the authentication service 6, which has the ability to verify the authentication credential. The authentication service 6 performs an authentication check, and, following successful authentication, can signal successful registration to the field device 2, as illustrated in FIG. 2. Following successful authentication of the device 2 with respect to the authentication service 6, the authentication service transmits a device ID of the device 2 to the commissioning service 7, as illustrated in FIG. 2. The commissioning service 7 then transmits, depending on the device ID of the authenticated device 2, an associated control program code SPC to the control device 4, which then controls the authenticated device 2 by the control program code SPC, as illustrated in FIG. 2. After successful transmission of the control program code SPC to the control device 4, in one possible embodiment the authenticated device 2 is connected via the network access switch 3 via a second VLAN connection VLAN 2 to the control device 4, and is controlled by the control device 4 with the aid of the control program code SPC.

In one possible embodiment of the method according to the invention, the commissioning service CS 7 generates the control program code SPC depending on the device ID of the authenticated device 2 (GEN SPC) as illustrated in FIG. 2. Alternatively, the commissioning service 7 can also functionally extend a control program code SPC that already exists for the authenticated device 2. In one possible embodiment, the extension or generation of the control program code SPC is performed by the commissioning service 7 not only depending on the device ID of the authenticated device 2, but in addition also depending on the transmitted device property data of the authenticated field device 2.

In one possible embodiment, the authentication service 6 and the commissioning service 7 can constitute one functional unit. Furthermore, in one possible embodiment, the network access switch 3 can be connected directly to the authentication service 6 without connecting a proxy server 5 in between. In one possible embodiment, the authentication service 6 can, following unsuccessful authentication, not admit the field device 2, and/or block network access. The authentication service 6 can check the totality of all the data available to it about a device 2. The authentication service 6 can in this case decide whether the authentication of the device 2 succeeded or failed on the basis of a single data item or a combination of data items. For example, the authentication service 6 can decide, on the basis of a demand on the communication network that is incompatible with the configured installation and the configured communication cycle, that the device 2 is not to be given access to the network. Checking the authentication data, on the basis for example of a device certificate of the device 2, can also be performed at another service or another server, for example a real-time NAC manager, physically or logically separate from the checking of the device properties, in particular the real-time properties of the device 2.

In one possible embodiment, the field device 2 can, for its authentication, also transmit authentication data, for example a machine identifier or a crypto-token, as well as the additional data for describing its device-specific properties, which can be passed on by the authentication service 6 to the commissioning service 7. Alternatively, the authentication service 6 can also read such data from a database on the basis of the device ID of the device 2, and make the data available to the commissioning service 7. The device property data can comprise all the data relevant to operation of the device 2 and for communication, in particular the behavior of the device 2 on a real-time communication bus. This device property data can, for example, state parameters that the device 2 places as requirements on a real-time communication bus, for example a cycle time of the device 2. The device property data can, for example, relate to the location where the device 2 is fitted in the automation installation.

Figure 3:
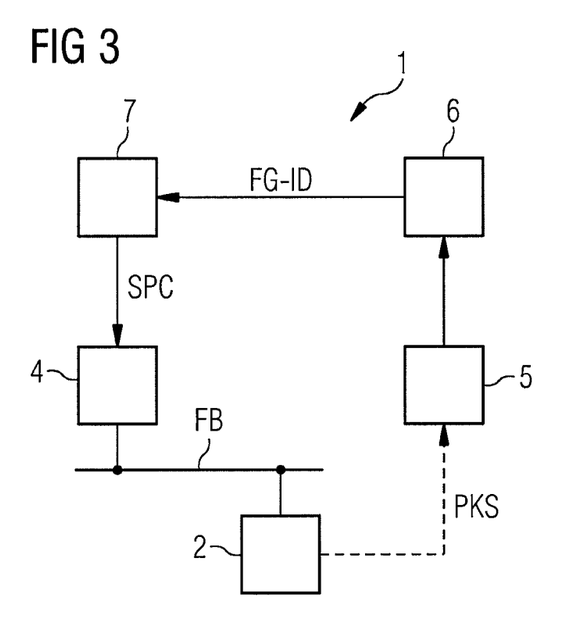
FIG. 3 illustrates a further exemplary embodiment of a system according to the invention for providing a control program code.

The system 1 according to the invention and the method according to the invention can comprise different variant embodiments. In the embodiment illustrated in FIG. 3, a field device 2 is connected to a control device 4 via a fieldbus FB, and comprises a proxy communication interface PKS to a proxy server 5. The interface between the field device 2 and the proxy server 5 is, in one possible embodiment, a wired interface. Alternatively, the proxy communication interface PKS can be a wireless interface, for example to an IP-based network. The field device 2 authenticates itself via the proxy communication interface PKS with respect to the proxy server 5, which passes the authentication information on to the authentication service 6. The authentication service 6 examines the authentication of the device 2 with reference to an authentication credential of the device 2. The proxy server 5 can constitute a representative for one or more control devices 4 in the field, with which the field device 2 should connect for its control. This proxy server 5 can, for example, be introduced, since control devices cannot as a rule respond flexibly to requests to establish a session in a communication connection, in particular if their communication behavior has a fixed configuration. In one possible embodiment, the configuration of VLANs at a LAN switch is performed by a remote communication terminal of the field device 2. If, for example, a field device 2 has not yet been entered into a switching table of the LAN switch, it is assigned by default to a bootstrapping VLAN (VLAN 1), whose only remote communication terminal is the proxy server 5.

Figure 4:
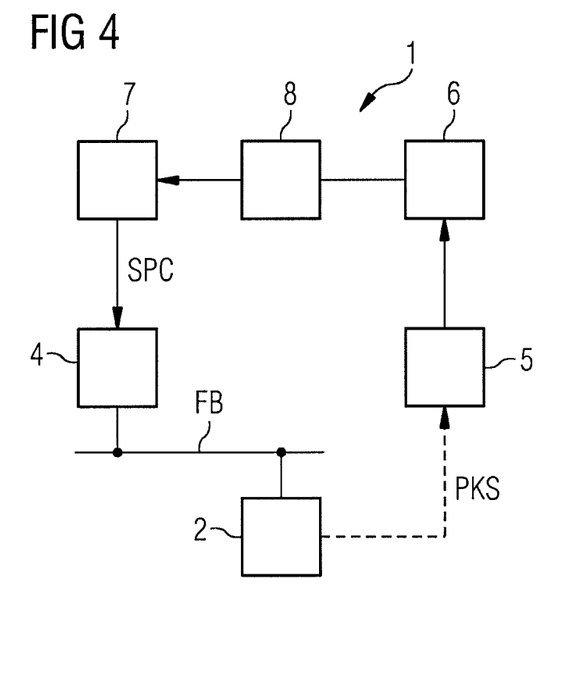
FIG. 4 illustrates a further exemplary embodiment of a system according to the invention for providing a control program code.

After authentication, the field device 2 can optionally be assigned to a further VLAN (VLAN 2) or to one of a plurality of further VLANs (VLAN 2, 3, 4 etc.), which permits data exchange with the optionally present real-time NAC manager 8 (shown in FIG. 4). This assignment is preferably made after successful authentication of the field device 2 by the authentication service 6, which, for example, configures this new VLAN assignment (VLAN 2) using an SNMP protocol at the network access switch 3.

FIG. 4 shows a further exemplary embodiment of the system 1 according to the invention, in which a real-time NAC manager 8 is provided between the authentication service 6 and the commissioning service 7. If the optional real-time NAC manager 8 has endorsed admission of the device 2 to the network, then in one possible embodiment it will configure the network access switch 3, for example using SNMP, in such a way that the field device 2 is assigned to the operative VLAN, and its information about the new or exchanged field device 2 is passed on to the commissioning service 7. If there is no real-time NAC manager 8, the device 2 can also be assigned to the operative VLAN by the authentication service 6.

In the event of a positive result, the real-time NAC manager 8 or the authentication service 6 passes the identity information of the device 2 on to the commissioning service 7. The commissioning service 7 can convey the control program code SPC, and can in this case use an existing mechanism for reprogramming the control program code SPC. In one possible embodiment, it is possible for the assignment into the VLAN to be synchronized with the commissioning of the device 2.

Figure 5:
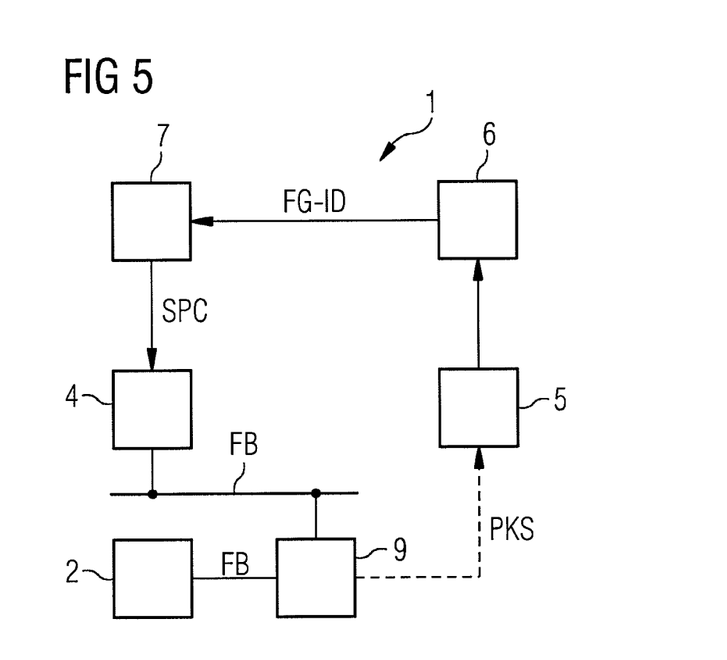
FIG. 5 illustrates a further exemplary embodiment of a system according to the invention for providing a control program code.

FIG. 5 shows a further exemplary embodiment of the system 1 according to the invention. In the exemplary embodiment illustrated in FIG. 5, the field device 2 is connected to an additional device 9 for the provision of an interface. The device 9 is connected to an interface of the field device 2, and performs the communication with the proxy server 5. The additional device 9 can, potentially, be removed, as soon as the authentication of the device 2 with respect to the authentication service 6 has been successfully completed. In one possible embodiment, the authentication credentials of the field device 2 that are necessary for the authentication are available to the device 9 which makes the interface available. The device 9 can in this case recognize the identity of the field device 2 on the basis of the communication via the interface between the device 9 and the field device 2, or alternatively can explicitly request the identity of the field device 2 from the field device 2. The additional device 9 for provision of the interface can, as illustrated in FIG. 5, be connected via a wired interface, for example a fieldbus FB, to the field device 2.

Figure 6:
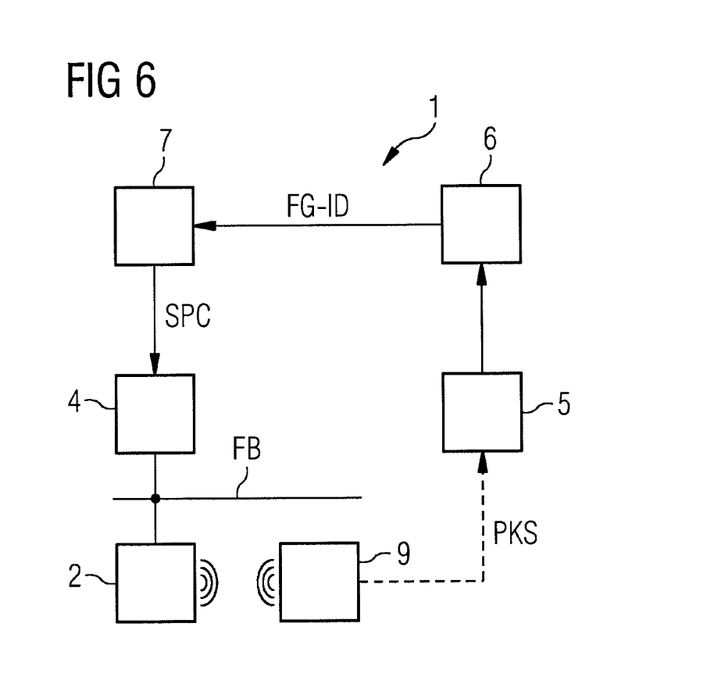
FIG. 6 illustrates a further exemplary embodiment of a system according to the invention for providing a control program code.

FIG. 6 shows an alternative embodiment, in which the additional device 9 is connected to the field device 2 via a wireless interface. The additional device 9 in this case communicates via a wireless interface, for example an RFID interface, with the field device 2, and has a proxy communication interface PKS with the proxy server 5. The device 9 can, for example, determine the identity or device ID of the field device 2 in the form of a serial number via the wireless interface, and, if relevant, obtain further information or data about the field device 2.

Figure 7:
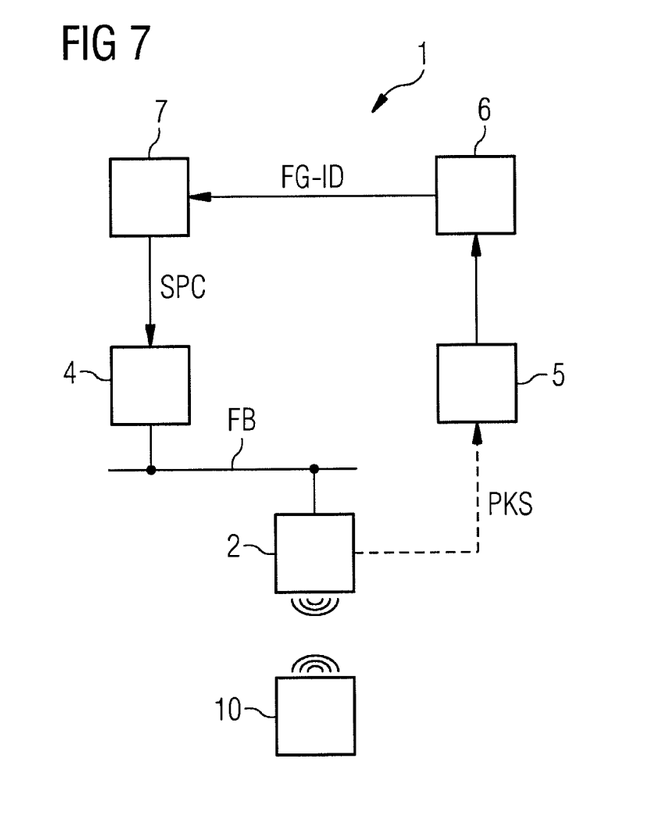
FIG. 7 illustrates a further exemplary embodiment of a system according to the invention for providing a control program code.

FIG. 7 shows a further exemplary embodiment of the system 1 according to the invention. In this embodiment, the authentication credentials of the field device 2 are made available by a further device 10 which is, for example, temporarily connected to the field device 2. This additional device 10 can be connected to the field device 2 via a wired interface or, as illustrated in FIG. 7, via a wireless interface. The additional device 10 provides the authentication credentials necessary for the authentication of the field device 2. The additional device 10 can be removed as soon as the authentication of the field device 2 has successfully been completed. For example, the additional device 10 can communicate with the field device 2 via a wireless RFID interface.

In one further possible embodiment of the system 1 according to the invention, the code extension of the control program code SPC is not restricted to a control program code SPC, but all of the devices connected to the fieldbus FB are reconfigured. This can, for example, be initiated by an engineering/commissioning service 7.

With the method and system according to the invention, the outlay for the exchange or new installation of a device 2, in particular a field device, is significantly reduced. In particular, a manual programming or reprogramming of a control program code SPC for a new or exchanged device can be omitted. Furthermore, the system 1 according to the invention can use existing engineering/commissioning mechanisms. Furthermore, a new or exchanged device 2 (after successful authentication, which however can be done entirely transparently) can be used directly in a "plug and work" manner. The system 1 according to the invention thus significantly increases the flexibility of an automation installation that incorporates devices, in particular field devices. If an additional device provides the interface to the proxy server, then field devices that do not themselves comprise the mechanism necessary for this can also be installed as "plug and work". The devices 2 can involve arbitrary devices, in particular field devices, for example drive devices, motors and sensors or actuators or combined devices, for example a robot arm in a production facility. The different devices 2 can communicate with one another via a communication bus, for example a fieldbus, using a fieldbus protocol. The fieldbus FB can be implemented with wires or wirelessly. The transmission of the data over the fieldbus FB is preferably performed deterministically in real time. The method according to the invention for providing a control program code SPC for controlling a device 2, in particular a field device that is connected to a control device, can for its part be implemented as a program. This program is, for example, stored in a program memory, and comprises instructions for carrying out the method according to the invention for providing a control program code SPC for controlling a device 2.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A system for providing a control program code for controlling a device, the system comprising:
 a network access switch;

a controller including memory and operatively connected to the device, said controller controlling the device;

a proxy server, the proxy server and the controller including the memory being connected to the network access switch;

an authentication service which authenticates the device based on a device ID and an authentication credential comprising a pair of cryptographic keys having a private or secret key stored under access protection on the device and, after successful authentication of the device, transmits the device ID of the authenticated device; and a commissioning service which receives the device ID transmitted by the authentication service and, based at least in part on the received device ID of the authenticated device, transmits a control program code to the controller including the memory, which controls the authenticated device by the control program code;

wherein the network access switch is operable to connect the device to the proxy server via a first VLAN connection during authentication of the device, and operable to connect the device to the controller via a second VLAN connection after transmittal of the control program to the controller including the memory.

2. The system as claimed in claim 1, wherein the commissioning service one of:
(a) generates the control program code based at least in part on the device ID received from the authenticated device; and
(b) extends an existing control program code for the authenticated device.

3. The system as claimed in claim 2, wherein the commissioning service one of:
(a) generates the control program code based at least in part on the device ID of the authenticated device, and
(b) changes an existing control program code for the authenticated device;
wherein (a) and (b) are based at least in part on an examination of the device ID of the authenticated device with reference to an examination rule which indicates whether a new control program code should be generated or the existing control program code should be changed.

4. The system as claimed in claim 2, wherein the commissioning service one of:
(a) generates the control program code based at least in part on the device ID of the authenticated device and based at least in part on device property data of the authenticated device, and
(b) changes an existing control program code for the authenticated device.

5. The system as claimed in claim 1, wherein the device is a field device connected via the network access switch.

6. The system as claimed in claim 1, wherein the proxy server is connected to the authentication service.

7. The system as claimed in claim 1, wherein the device is connected to the authentication service during the authentication via the first VLAN connection and the proxy server.

8. The system as claimed in claim 1, wherein the controller, after receipt of the control program code, connects via the second VLAN connection to the authenticated device and controls the device via the received control program code.

9. The system as claimed in claim 1, wherein the device receives the authentication credential from an external device connected to the device via a local, wireless or wired interface.

10. A method for providing a control program code for controlling a device connected to a controller including memory, the method comprising:
authenticating, by an authenticating service, the device based on a device ID and an authentication credential comprising a pair of cryptographic keys having a private or secret key stored under access protection on the device;
transmitting, by the authenticating service, in cases of a successful authentication of the device, the device ID of the authenticated device;
transmitting, by the authentication service, the device ID of the authenticated device to a commissioning service; and
transmitting, by the commissioning service, based at least in part on the device ID of the authenticated device received from the authentication service, a control program code to the controller including the memory;
wherein the controller controls the authenticated device via the control program code; and
wherein a network access switch connects the device to a proxy server via a first VLAN connection during authentication of the device, and connects the device to the controller including the memory via a second VLAN connection after transmittal of the control program to the controller including the memory.

11. The method as claimed in claim 10, wherein the commissioning service performs one of:
(a) generating the control program code based at least in part on the device ID transmitted by the authenticated device, and
(b) extending an existing control program code for the authenticated device.

12. The method as claimed in claim 11, wherein the commissioning service generates or extends the control program code based at least in part on device property data of the authenticated device.

* * * * *